Nov. 22, 1949     C. LAURENT     2,488,821
TELEPHONIC CALL MAGNETO
Filed Jan. 4, 1946     2 Sheets—Sheet 1
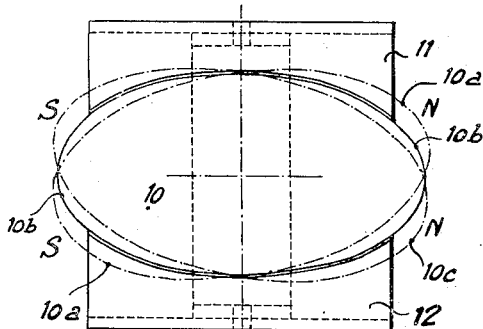
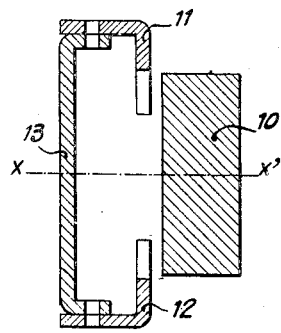
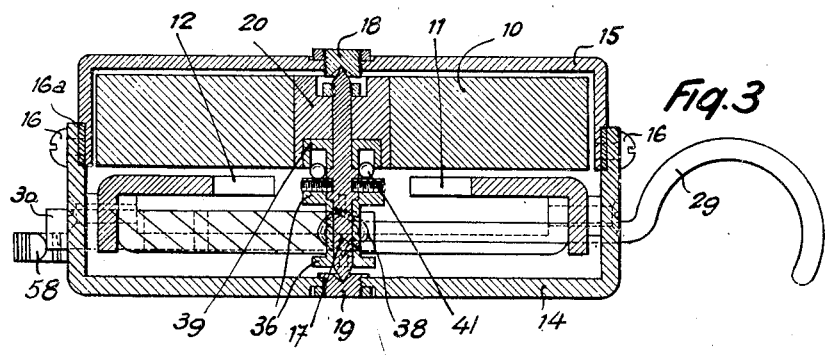
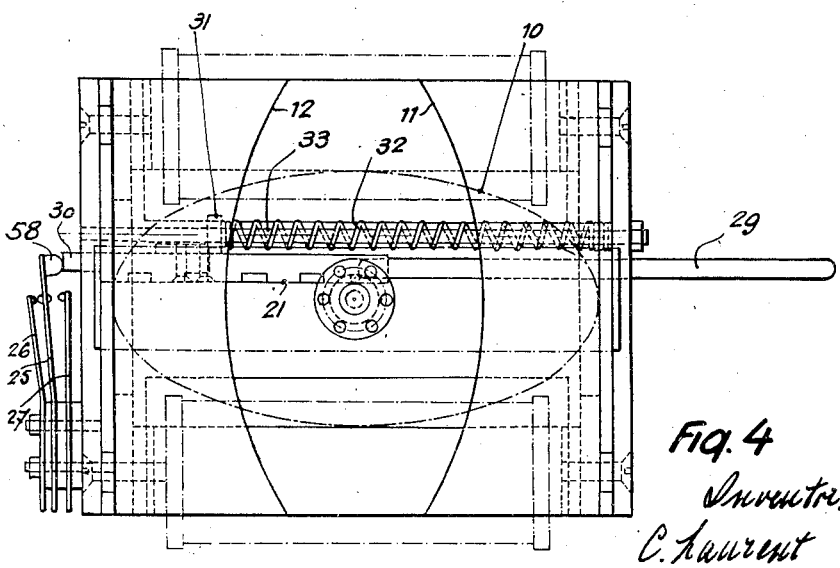

Nov. 22, 1949 — C. LAURENT — 2,488,821
TELEPHONIC CALL MAGNETO
Filed Jan. 4, 1946 — 2 Sheets-Sheet 2
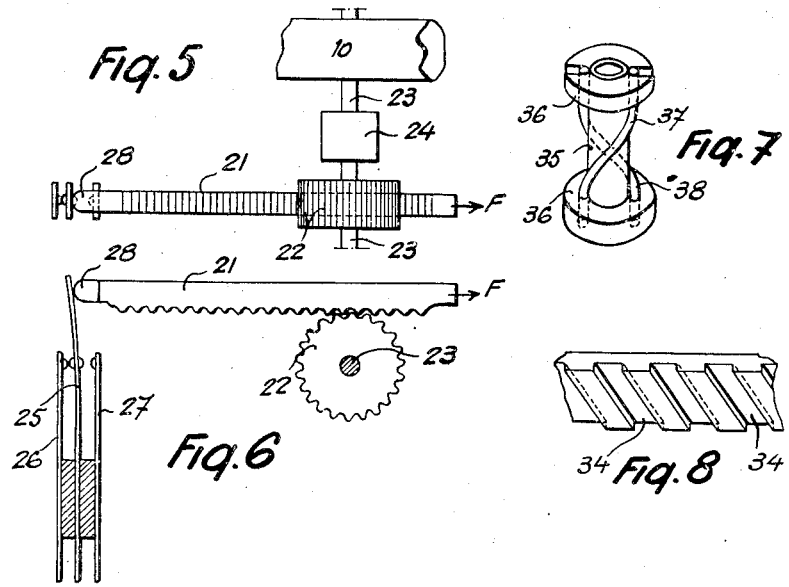
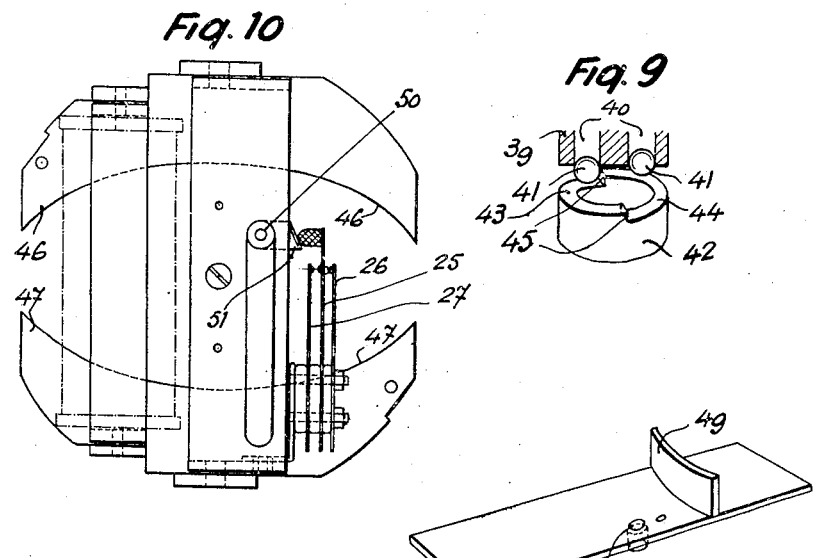
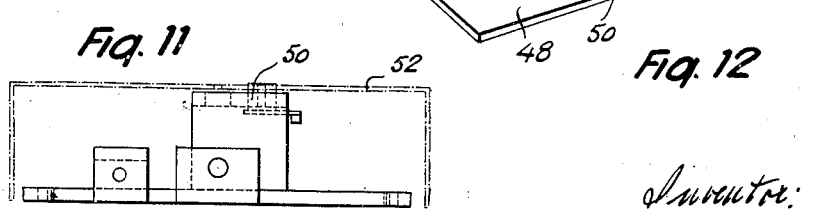

Patented Nov. 22, 1949

2,488,821

UNITED STATES PATENT OFFICE 2,488,821

TELEPHONIC CALL MAGNETO

Charles Laurent, Paris, France

Application January 4, 1946, Serial No. 639,087
In France March 13, 1941

Section 1, Public Law 690, August 8, 1946
Patent expires March 13, 1961

3 Claims. (Cl. 171—209)

This invention relates to a telephonic call magneto of the unwound rotor type.

Magnetos of this type, as heretofore designed, comprise a rotor carrying the magnets, driven by means of a crank and a step-up gearing, and connection contacts actuated by means of a sliding shaft. Owing to the fact that the axle of the crank is offset relative to the rotor shaft, and owing to the shifting of the sliding shaft establishing the connection, these magnetos occupy, at the same electromotive force, a volume of the same order as the magnetos of the wound armature type.

The present invention has for one of its objects to provide a magneto of the unwound rotor type which will be at least not larger than the usual dialling plate of automatic telephone apparatuses, and will at least fit within the same space as that occupied by such dialling plate, i. e. in a cylindrical space about 80 mm. in diameter and 35 mm. high. The new device is characterized by the provision of a novel kind of driving means for the rotor, a novel kind of switch actuating means, a novel, very flat form of the magnet, of the pole pieces and of the air gap between the magnet which constitutes the rotor and the pole pieces of the stator, and comprises other features of construction, mounting and arrangement of the parts.

A sufficiently great electromotive force is obtained, in spite of the small volume of the magneto, by a novel combination of features, partly novel as such, in which a flat magnet of elliptical profile, magnetized for north poles on one and for south poles on the other side of the small axis of the ellipse, is operatively connected with driving means capable of intermittently rotating the magnet from a stable position of rest in front of, and parallel to, the pole pieces of a stator which confine between them a clearance space of elliptical profile having substantially the same surface area as the rotary magnet in its position of rest, the soft iron core of the stator carrying the generating coil. These elements are arranged for cooperation in establishing a magnetic circuit having an air gap of constant width and of a surface area equal to the covering surface of the pole pieces and the magnetic rotor. The parts are so arranged that in the position of rest of the intermittent driving device the rotor faces exactly the clearance space between the pole pieces and that the driving device in its position of rest also actuates the connection contacts.

In the drawings affixed to this specification and forming part thereof, two embodiments of this invention are illustrated diagrammatically by way of example.

In the drawings:

Fig. 1 shows in a schematic manner the general principle of the new magneto;

Fig. 2 is a cross section of the parts shown in Fig. 1, showing more especially the arrangement of the pole pieces;

Fig. 3 is an axial section of the magneto lodged within the socket of a telephone apparatus;

Fig. 4 is a plan view of Fig. 3;

Figs. 5 and 6 are a plan view and a front view, respectively, of the magnet drive mechanism controlling also the connection contacts, while Figs. 7 and 8 show details of this mechanism, drawn to a larger scale.

Fig. 9 illustrates the free-wheel device forming part of the same mechanism.

Fig. 10 is a detailed view of the pole pieces and the connection contacts, arranged for use instead of the call dial at a telephone station, Fig. 11 being a top view corresponding to Fig. 10.

Fig. 12 is a perspective view of a pushing member adapted for use in connection with the embodiment illustrated in Figs. 10 and 11.

Referring to the drawings and first to Figs. 1 and 2, 10 is the magnet having the form of a flat block of elliptical contour, made of a special aluminium alloy and mounted for rotating movement in front of two pole pieces 11 and 12 of similar elliptical contour, the axis of rotation X—X' of the magnet being perpendicular to the plane of this ellipse and passing through its center. In the position 10a, 11 is a north pole and 12 a south pole. 10b indicates the neutral position of the magnet (Fig. 1), while in 10c there exists a south pole 11 and a north pole 12. The magnetic flux in the coil, of which only the magnetic core 13 is shown in Fig. 2, connecting the poles, is reversed by displacement of the magnet from 10a to 10c whereby a variation of magnetic flux occurs equal to double the flux produced by the magnet in the system, and this during the period of time needed by the magnet in moving from position 10a to the position 10c. For the armature winding one or several flat iron coils may be used similar to the types commonly employed in telephonic relays.

In Figs. 3 and 4, illustrating one embodiment of the call magneto according to the invention, the magnet 10 and the two pole pieces 11 and 12 are shown arranged within a casing comprising a bottom portion 14 and a cover 15 both made of a nonmagnetic material and interconnected by any suitable means, such as screws 16, an insulating band 16' being preferably inserted between the adjoining portions of the parts 14 and 15. Thus the entire apparatus presents itself in the shape of a flat box of little volume. The axis of rotation X—X' of the magnet (Fig. 2) is here represented as a shaft 17 mounted for rotating movement between two bearing plates 18—19, said bearings being made of a suitable hard material and screw connected to the bottom part 14 and cover 15 respectively of the housing. The friction which they oppose to the rotation of the magnet is thus reduced to a minimum. The magnet 10 is keyed to its shaft 17, a part 20 being inserted between them. Instead of being imparted a continuous movement generally exerted by a crank, the rotating movement of the magnet is determined by intermittent driving of a toothed rack and a free wheel, the toothed rack, according to a particular point of the invention, simultaneously controlling the connection contacts of the magneto. As shown in a schematic way in Figs. 5 and 6 a rack 21 engages a pinion 22 having its shaft 23 with the magnet 10 keyed to it, divided into two parts that are interconnected by the free wheel device 24 (Fig. 5). While at rest, the rack 21 bears against the springs 25—26 thereby ensuring the connection by means of an insulating pusher device 28. The displacement of the rack exerted in the direction of the arrows F allows the springs to return to their natural position thereby causing them to establish the required contacts. In the embodiment illustrated in Figs. 3 and 4, the rack 21 is terminated outside casing 14 by a pulling hook 29 at the one end, while at its opposite end it extends slightly outside the casing when at rest, as shown by reference numeral 30, and establishes the contact between the springs 25 and 26 by means of the insulating pusher 58. Inside the casing the rack is connected by means of an eye bolt 31 to a compression spring 32 bearing with one of its ends upon this eye bolt 31 and with its opposite end against the inner wall of the casing. The spring is guided by a rod 33.

According to a further characteristic of the invention, the rack 21 and the pinion 22 engaging therewith may be given a particular shape so as to reduce to a minimum the friction between these two elements. The rack (Fig. 8) comprises a bar with grooves 34 forming inclined teeth. Instead of the usual pinion 22, a driver, as shown in Fig. 7, is used comprising a central core 35 held between two small plates or disks 36 and helicoidal slopes formed of steel wires 37 and 38 helicoidally wound through half a turn about the central core 35. The grooves 34 of the toothed rack (Fig. 8) are inclined at the angle of the helix and the distance between each other is equal to half the pitch or, in other words, to the length of half of the circumferential pitch line. Thus will be ensured the rolling of the helix fixed to the rotating part in the inclined plane of the grooves in the rack. This arrangement as regards the rotating part, requires but a very small circumferential pitch and thus concurs in reducing the volume of the whole and permitting a very short stroke of the rack.

Fig. 9 shows an embodiment of the free wheel device whereby, once started, the magnet will be enabled to continue its rotating movement. The element 39, forming part of the driven part which, itself, is fixed to the magnet 10, is provided with circular depressions 40 disposed parallelly to the axis of rotation and containing a ball each. For reasons of simplifying the drawing two balls only are shown here. The element 42 forming part of the driven element, being loose on the shaft 17 of the magnet, is provided with two helicoidally cam faces 43 and 44 respectively, each terminating in an offset 45. If the direction of rotation is such that the element 42 will present itself in front of each ball with its inclined plane, the two elements 42 and 39 are not coupled. If, on the other hand, the element 42 presents itself in front of each ball with its offset part 45, the ball will be gripped and the driven part 39 will be carried along by the driving part 42. The balls 41 may be bearing upon the driving part 42, either under their own weight or due to the action of a small spring that might be lodged in each of the hollows 40 provided in the element 39.

The embodiment according to Figs. 3 and 4, with its several elements as illustrated in Figs. 5 to 9, is of the type in which the magnet is arranged within the flat socket of certain types of apparatus A second embodiment, shown in Figs. 10, 11 and 12, is preferably used in the case where no dialling disk is required in the magneto. In this case the shape of the pole pieces will be altered as shown in 46 and 47 (Fig. 10) the volume of the coil being reduced so that the volume of the entire unit will be very much the same as that of a dialling device, and the magneto may consequently be substituted for the dial in the respective apparatus. The operation of the rack is controlled by a pusher 48 mounted on the outer wall as shown in perspective in Fig. 12. To operate the magneto this pusher is pulled downwardly by means of a protruding handle and, upon its release, urged back into its original position by a return spring similar to the spring 32 shown in Fig. 4. A part 50 with a nib 51 fixed to the rack (not shown) acts, on the one hand, as an intermediary between said rack and the pusher 48 and, on the other hand, to ensure control of the springs 25—26—27. A cover 52 shown in dotted lines in Fig. 11, made of a non-magnetic material protects the entire apparatus.

I wish it to be understood that I do not desire to be limited to the exact details shown and described, for obvious modifications will occur to a person skilled in the art.

What is claimed is:

1. In a telephonic call magneto in combination, a magnetic rotor constituted by a magnet of elliptical contour, magnetized for north and south poles on one and the other side respectively of the small axis of the ellipse and capable of rotating from a stable position of rest in front of and parallel to the pole pieces of the stator, a stator comprising two pole pieces confining between them a clearance space of elliptical contour having substantially the same surface area as the rotor in its position of rest, a soft iron core, a generating coil on said core, said elements being arranged for cooperation with said rotor in establishing a magnetic circuit having an air gap of constant width and of a surface area equal to the covering surface of the pole pieces and the magnetic rotor, means for intermittently driving said rotor, said driving means having a position of rest, in which the rotor faces exactly the clearance space between the pole pieces, and simultaneously serving for actuating, in their position of rest, the connection contacts.

2. In a telephonic call magneto in combination, a magnetic rotor constituted by a magnet of elliptical contour, magnetized for north and south poles on one and the other side, respectively of the small axis of the ellipse and capable of rotating from a stable position of rest in front of and parallel to the pole pieces of the stator, a stator comprising two pole pieces confining between them a clearance space of elliptical contour having substantially the same surface area as the rotor in its position of rest, a soft iron core, a generating coil on said core, said elements being arranged for cooperation with said rotor in establishing a magnetic circuit having an air gap of constant width and of a surface area equal to the covering surface of the pole pieces and the magnetic rotor, means for driving said rotor comprising a rack, a pinion mounted on the rotor shaft and meshing with said rack, a free-wheel device inserted between said rotor and said pinion, the position of rest of said rack corresponding to the position of rest of said rotor, and means at one end of said rack for actuating, in its position of rest, the connection contacts.

3. In a telephonic call magneto the combination of a rotor in the form of a flat magnet block of elliptical contour with a stator and pole pieces confining between them a clearance space of elliptical contour having substantially the same surface area as said rotor.

CHARLES LAURENT.

REFERENCES CITED

The following references are of record in the file of this patent:

UNITED STATES PATENTS

| Number | Name | Date |
|---|---|---|
| 580,335 | Libbey | Apr. 6, 1897 |
| 685,685 | Krahenbuhl | Oct. 29, 1901 |
| 844,991 | Allen | Feb. 7, 1907 |
| 1,657,910 | Allen et al. | Jan. 31, 1928 |
| 2,232,452 | Harmon | Feb. 18, 1941 |

FOREIGN PATENTS

| Number | Country | Date |
|---|---|---|
| 413,010 | France | July 29, 1910 |
| 260,102 | Germany | May 20, 1913 |